(12) United States Patent
Lin et al.

(10) Patent No.: US 12,153,314 B2
(45) Date of Patent: *Nov. 26, 2024

(54) DISPLAY PANEL

(71) Applicant: INNOLUX CORPORATION, Miao-Li County (TW)

(72) Inventors: Li-Ming Lin, Miao-Li County (TW); Chih-Ming Liang, Miao-Li County (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,744

(22) Filed: Apr. 21, 2023

(65) Prior Publication Data

US 2023/0258988 A1 Aug. 17, 2023

Related U.S. Application Data

(60) Continuation of application No. 17/836,713, filed on Jun. 9, 2022, now Pat. No. 11,662,633, which is a division of application No. 17/038,860, filed on Sep. 30, 2020, now Pat. No. 11,385,511, which is a division of application No. 16/510,159, filed on Jul. 12, 2019, now Pat. No. 10,824,036, which is a division of application No. 15/645,471, filed on Jul. 10, 2017, now Pat. No. 10,394,096, which is a continuation of application No. 14/729,661, filed on Jun. 3, 2015, now Pat. No. 9,733,534.

(30) Foreign Application Priority Data

Jul. 1, 2014 (TW) .................................. 103122681

(51) Int. Cl.
*G02F 1/1362* (2006.01)
*G02F 1/1335* (2006.01)

(52) U.S. Cl.
CPC .. *G02F 1/136209* (2013.01); *G02F 1/133512* (2013.01)

(58) Field of Classification Search
None
See application file for complete search history.

(56) References Cited

U.S. PATENT DOCUMENTS

| | | | | |
|---|---|---|---|---|
| 5,128,786 A | * | 7/1992 | Yanagisawa | G02F 1/133512 349/122 |
| 5,412,494 A | * | 5/1995 | Ishiwata | G02F 1/133512 349/110 |
| 11,385,511 B2 | * | 7/2022 | Lin | G02F 1/133512 |
| 2016/0139444 A1 | * | 5/2016 | Zhang | G02F 1/13439 257/72 |

* cited by examiner

*Primary Examiner* — Richard H Kim
(74) *Attorney, Agent, or Firm* — MUNCY, GEISSLER, OLDS & LOWE, P.C.

(57) ABSTRACT

A display panel includes a first substrate and a shading structure. The shading structure is disposed on the first substrate. The shading structure includes a plurality of first parts and a second part. One of the plurality of first parts extends along a first direction. The second part protrudes from the one of the plurality of first part. Wherein the second part is separated from another one of the plurality of first parts adjacent to the one of the plurality of first parts, and the another one of the plurality of first parts extends along the first direction.

6 Claims, 14 Drawing Sheets

DISPLAY PANEL

CROSS REFERENCE TO RELATED APPLICATIONS

This application is a Continuation Application (CA) of U.S. Ser. No. 17/836,713, filed on Jun. 9, 2022, which is a Divisional Application (DA) of U.S. Ser. No. 17/038,860, filed on Sep. 30, 2020, which is a Divisional Application (DA) of U.S. Ser. No. 16/510,159, filed on Jul. 12, 2019, which is a Divisional Application (DA) of U.S. Ser. No. 15/645,471, filed on Jul. 10, 2017, which is a Continuation Application (CA) of U.S. Ser. No. 14/729,661, filed on Jun. 3, 2015, which claims priority under 35 U.S.C. § 119(a) on Patent Application No(s). 103122681, filed in Taiwan, Republic of China on Jul. 1, 2014, the entire contents of which are hereby incorporated by reference.

BACKGROUND

Field of Invention

The disclosure relates to a display panel.

Related Art

The display panel is popularized and matured in technology nowadays, and recently the development direction thereof is towards the higher resolution, lower power consumption and larger size. One of the factors that affects the resolution is the uneven surface of the color filter material, which will cause a reduced transmittance. Furthermore, the above factor will also become more prominent when the pixel size is getting smaller and smaller (i.e. the smaller interval of the black matrix).

FIG. 1A is a schematic enlarged diagram of a second substrate of a conventional display panel, and FIG. 1B is a schematic enlarged diagram of the region A1 in FIG. 1A.

As shown in FIGS. 1A and 1B, the conventional display panel at least includes a first substrate (not shown), a display medium (not shown), a second substrate S2, a black matrix B and a color filter material C. The color filter material C is disposed between the black matrix B by corresponding to each of the pixel areas (not shown). It is clear from the figure that the color filter material C has a height difference at the overlap of the color filter material C and the black matrix B, and the height difference at the overlap of the color filter material C and the black matrix B will result in the scattered light. Therefore, if the height difference at the overlap of the color filter material C and the black matrix B has a larger proportion of the color filter material C, the transmittance will be reduced more.

By taking a full HD product as an example, the ratio of the flat portion to bulge portion is about 86/14 for the portion of the color filter material C corresponding to a single sub-pixel. Moreover, for the WQHD product having a higher resolution and a smaller sub-pixel than the full HD product, the ratio of the flat portion to the bulge portion for the portion of the color filter material C corresponding to a single sub-pixel will be reduced to 82/18. Furthermore, for the recently developed 4K2K product of high resolution, the ratio of the flat portion to the bulge portion for the portion of the color filter material C corresponding to a single sub-pixel will be even reduced to 72/28.

So, due to the increased resolution and less size of sub-pixel, the bulge C1 of the color filter material C at the vicinity to the black matrix B will become more significant for the transmittance.

In addition to the above problem, the smaller sub-pixel (smaller interval of the black matrix) also will cause the developer solution to be easily left between the black matrixes during the process, and therefore the photoresist will be hard to be completely clean and the carbon will be left. This problem also affects the transmittance of the display panel.

Therefore, it is an important subject to provide a display panel with the black matrix structure which can achieve a higher transmittance, when applied to a high-resolution product, and a reduced amount of the carbon remaining between the black matrixes during the process.

SUMMARY

An objective of the disclosure is to provide a display panel which can achieve a higher transmittance.

To achieve the above objective, a display panel according to the disclosure comprises a first substrate and a shading structure. The shading structure is disposed on the first substrate. The shading structure includes a plurality of first parts and a second part. One of the plurality of first parts extends along a first direction. The second part protrudes from the one of the plurality of first part. Wherein the second part is separated from another one of the plurality of first parts adjacent to the one of the plurality of first parts, and the another one of the plurality of first parts extends along the first direction.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE INVENTION

The present disclosure will be apparent from the following detailed description, which proceeds with reference to the accompanying drawings, wherein the same references relate to the same elements.

To be noted, the following embodiments shown in the figures are just for the illustrative purpose but not for representing the actual dimensions and size relation.

Figure 2A:
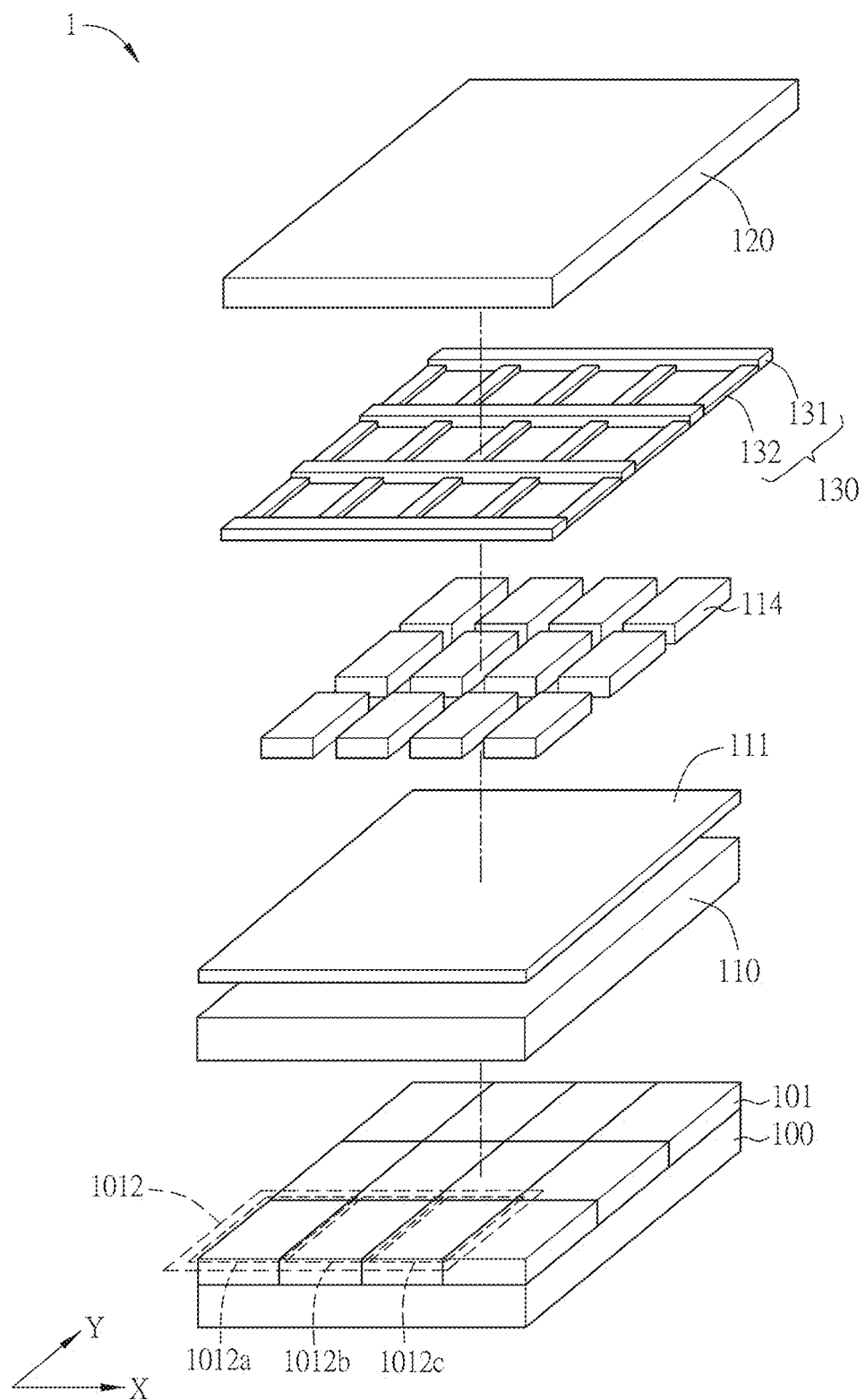
FIG. 2A is a schematic exploded diagram of a display panel of an embodiment of the disclosure.
Figure 2B:
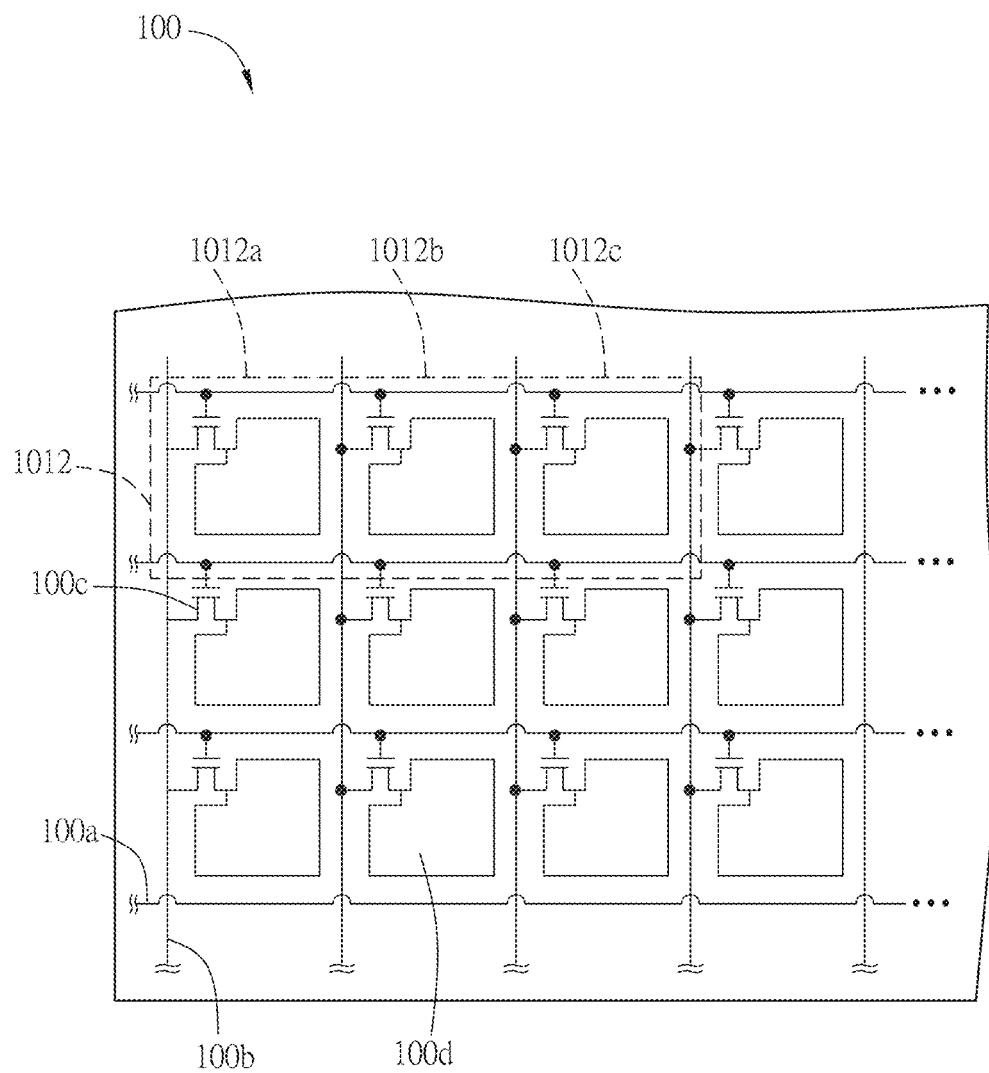
FIG. 2B is a schematic enlarged diagram of the first substrate in FIG. 2A.

As shown in FIGS. 2A and 2B, a display panel 1 can at least include a first substrate 100, a second substrate 120 and a black matrix 130. The display panel 1 can further include a display medium 110 disposed between the first substrate 100 and the second substrate 120. The display medium 110 can be liquid crystal material, plasma material or organic electroluminescent material for example. Therefore, with different types of the display medium 110, the display panel 1 can be a liquid crystal display panel, plasma display panel or organic light emitting display panel. The liquid crystal display panel will be taken as an example in the following embodiments, but those skilled in the art can analogize other display panels.

The first substrate 100 can be an active array substrate, but this disclosure is not limited thereto. The first substrate 100 includes a plurality of scan lines 100a and a plurality of data lines 100b which cross each other. The scan lines 100a and the data lines 100b are substantially perpendicular to each other to define a pixel matrix 101 including a plurality of pixel areas 1012. The pixel areas 1012 are arranged in a matrix, and each of the pixel area 1012 has a plurality of sub-pixel areas 1012a, 1012b, 1012c. In other words, in this embodiment, the sub-pixel areas 1012a, 1012b, 1012c can form a pixel area 1012.

Besides, those skilled in the art can comprehend that the patterned conductive layer includes a plurality of thin film transistors 100c and a plurality of pixel electrodes 100d.

The second substrate 120 is disposed on the first substrate 100. Herein, the second substrate 120 and the first substrate 100 are disposed oppositely, and that is, the second substrate 120 is disposed on the opposite side of the first substrate 100.

The first substrate 100 or second substrate 120 of this embodiment can be made by glass, quartz, organic polymer or other applicable material.

Besides, the display panel 1 can further include an electrode layer 111. The liquid crystal molecules of the display medium 110 can be driven by the electric field formed by the electrode layer 111 and the pixel matrix 101 to achieve different display effects.

The black matrix 130 is disposed between the first substrate 100 and the second substrate 120. Furthermore, the black matrix 130 is disposed between the second substrate 120 and the display medium 110. The black matrix 130 includes a plurality of row shading bars 131 and a plurality of column shading bars 132. Each of the row shading bars 131 is disposed corresponding to the position between the two adjacent rows of the pixel areas 1012, and for example, corresponding to the scan line 100a of the first substrate 100. The column shading bars 132 are disposed between the two adjacent row shading bars 131 and disposed corresponding to the position between the two adjacent sub-pixel areas 1012a, 1012b, 1012c. For example, some of the column shading bars 132 are disposed corresponding to the data lines 100b of the first substrate 100. Moreover, the scan lines 100a and the data lines 100b of the first substrate 100 cross each other and are substantially perpendicular to each other.

The black matrix 130 is made by black resin and formed into a grid structure for shading the light. The black matrix 130 can be disposed corresponding to the pixel matrix 101, and each of the meshes of the grid structure of the black matrix 130 is disposed corresponding to a pixel area or sub-pixel area of the first substrate 100. The detailed structure of the black matrix 130 will be illustrated later.

The display panel 1 of this embodiment can further include the color filter blocks 114 disposed between the display medium 110 and the second substrate 120. The color filter blocks 114 are disposed corresponding to the pixel areas 1012. The color filter blocks 114 can be the combination of red color filter blocks, green color filter blocks and blue color filter blocks. In other embodiments, the color filter blocks 114 may have another colorful combination, as long as the full color display effect can be achieved.

The structure of the black matrix layer is illustrated below.

Figure 3:
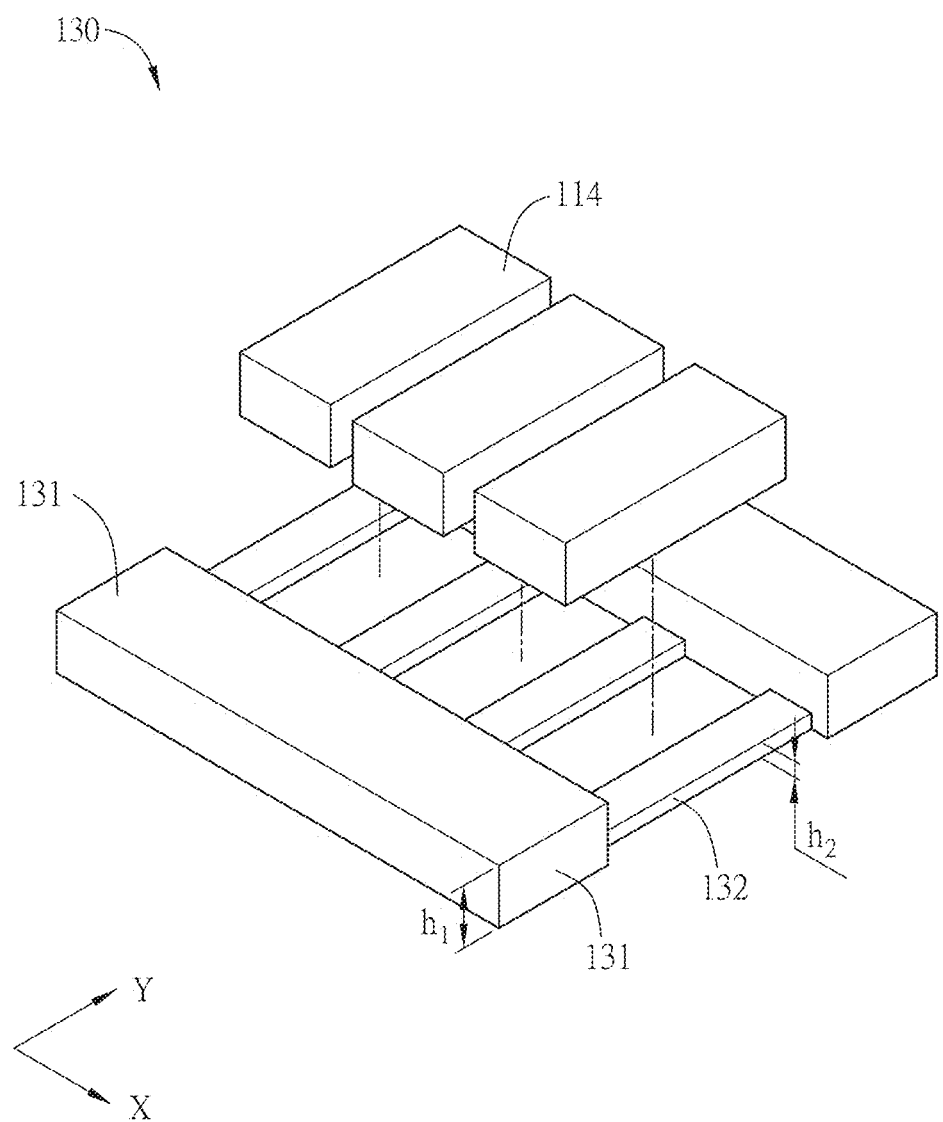
FIG. 3 is a schematic partial enlarged diagram of the color filter block and the black matrix in FIG. 2A according to the first embodiment of the disclosure.
Figure 4A:
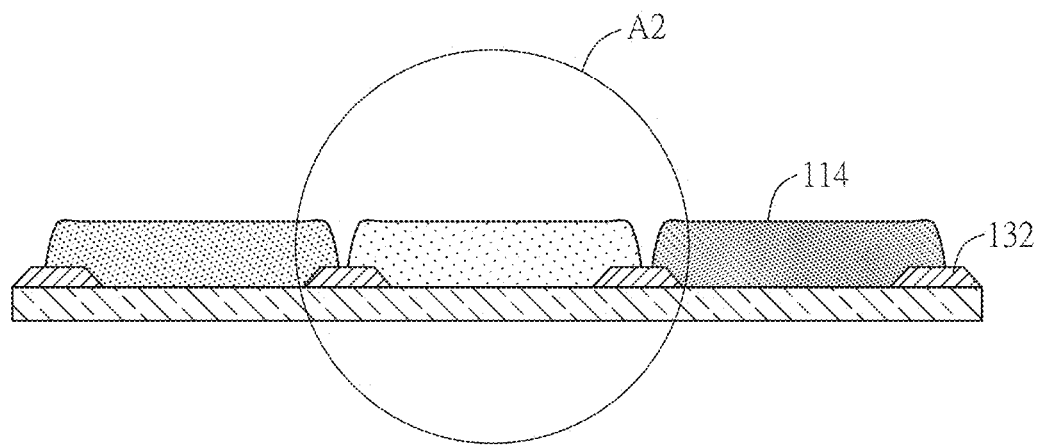
FIG. 4A is a schematic partial enlarged diagram of the second substrate of the display panel of this embodiment.
Figure 4B:
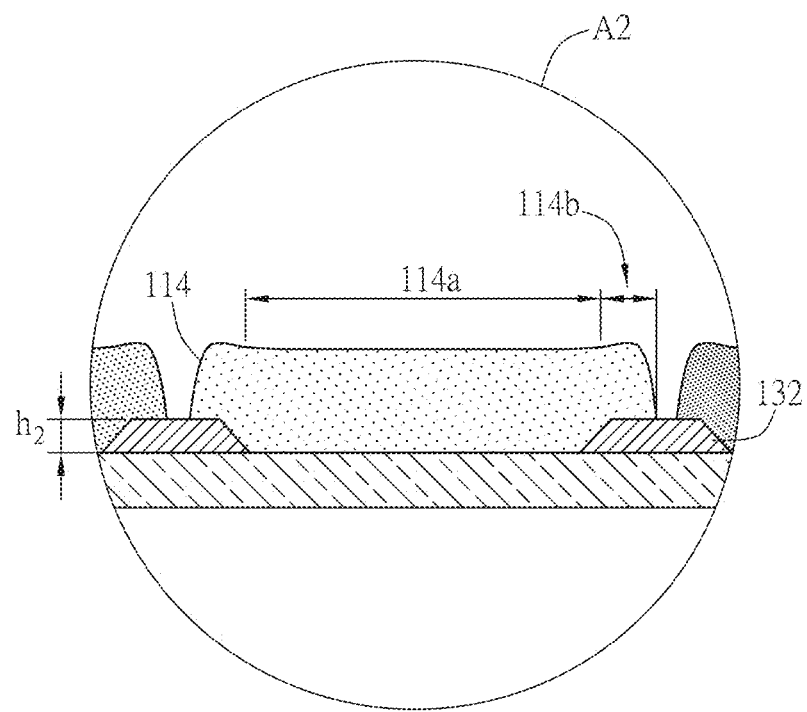
FIG. 4B is a schematic enlarged diagram of the region A2 in FIG. 4A.

FIG. 3 is a schematic partial enlarged diagram of the color filter block and the black matrix in FIG. 2A according to the first embodiment of the disclosure, FIG. 4A is a schematic partial enlarged diagram of the second substrate of the display panel of this embodiment, and FIG. 4B is a schematic enlarged diagram of the region A2 in FIG. 4A.

As shown in FIGS. 3, 4A, 4B, the black matrix 130 can be applied to the display panel and includes a plurality of row shading bars 131 and a plurality of column shading bars 132. The row shading bars 131 connect to the column shading bars 132 correspondingly. Each of the column shading bars 132 is disposed between the two adjacent row shading bars 131, and two ends of the column shading bar 132 connect to the two adjacent row shading bars 131.

The row shading bars 131 extend towards the X direction (the first direction) and has a first thickness $h_1$. Each of the row shading bars 131 is disposed corresponding to the position between the two adjacent rows of the pixel areas of the pixel matrix (not shown).

The column shading bars 132 extend towards the Y direction (the second direction) and has a second thickness $h_2$. Each of the column shading bars 132 is disposed corresponding to the position between the two adjacent sub-pixel areas. The second thickness $h_2$ is different from the first thickness $h_1$. In this embodiment, the second thickness $h_2$ is less than the first thickness $h_1$, and the X direction (the first direction) and the Y direction (the second direction) are substantially perpendicular to each other. In this embodiment, the first direction is different from the second direction.

Furthermore, the row shading bars 131 of this embodiment are disposed corresponding to the scan lines of the first substrate 100, and the column shading bars 132 are disposed corresponding to the data lines of the first substrate 100. Besides, the scan lines and data lines of the first substrate 100 cross each other.

In this embodiment, the first thickness $h_1$ of the row shading bar 131 can be between 1.2 μm and 2.0 μm, and the second thickness $h_2$ of the column shading bar 132 can be between 0.5 μm and 1.0 μm.

Figure 1A:
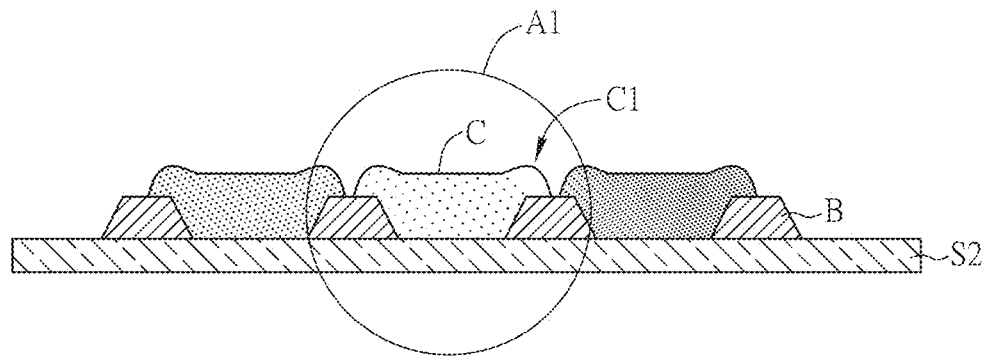
FIG. 1A is a schematic enlarged diagram of a second substrate of a conventional display panel.
Figure 1B:
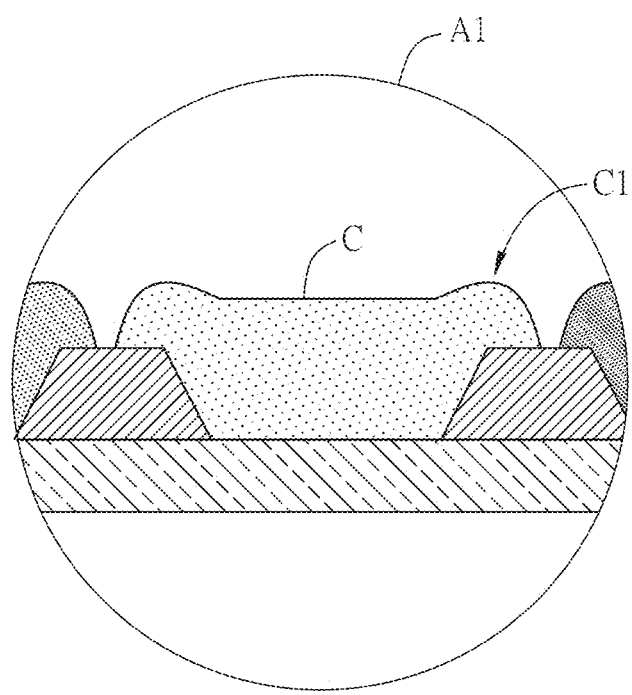
FIG. 1B is a schematic enlarged diagram of the region A1 in FIG. 1A.

In other words, the second thickness $h_2$ of the column shading bar 132 can be adjusted in this embodiment so as to be less than the first thickness $h_1$, and therefore when the color filter blocks 114 are disposed on the black matrix 130, the overlap 114b of the color filter blocks 114 and the black matrix 130 will have a less proportion than the flat portion 114a of the color filter block 114 corresponding to a single pixel area (sub-pixel area). Hence, the surface of the color filter block 114 will be more even (also referring to FIG. 1B). Thereby, the light will be less scattered and shifted when passing through the color filter blocks 114 so that the transmittance of the display panel can be enhanced.

In this embodiment, the row shading bar 131 and column shading bar 132 of the black matrix 130 can be formed with two different thicknesses by the halftone mask or optical proximity correction (OPC) mask.

Moreover, this embodiment only adjusts the second thickness $h_2$ of the column shading bar 132, so that the light shading ability of the row shading bar 131 and column shading bar 132 won't be affected and the entire optical density also won't be affected. Therefore, the entire contrast also won't be affected.

Figure 5A:
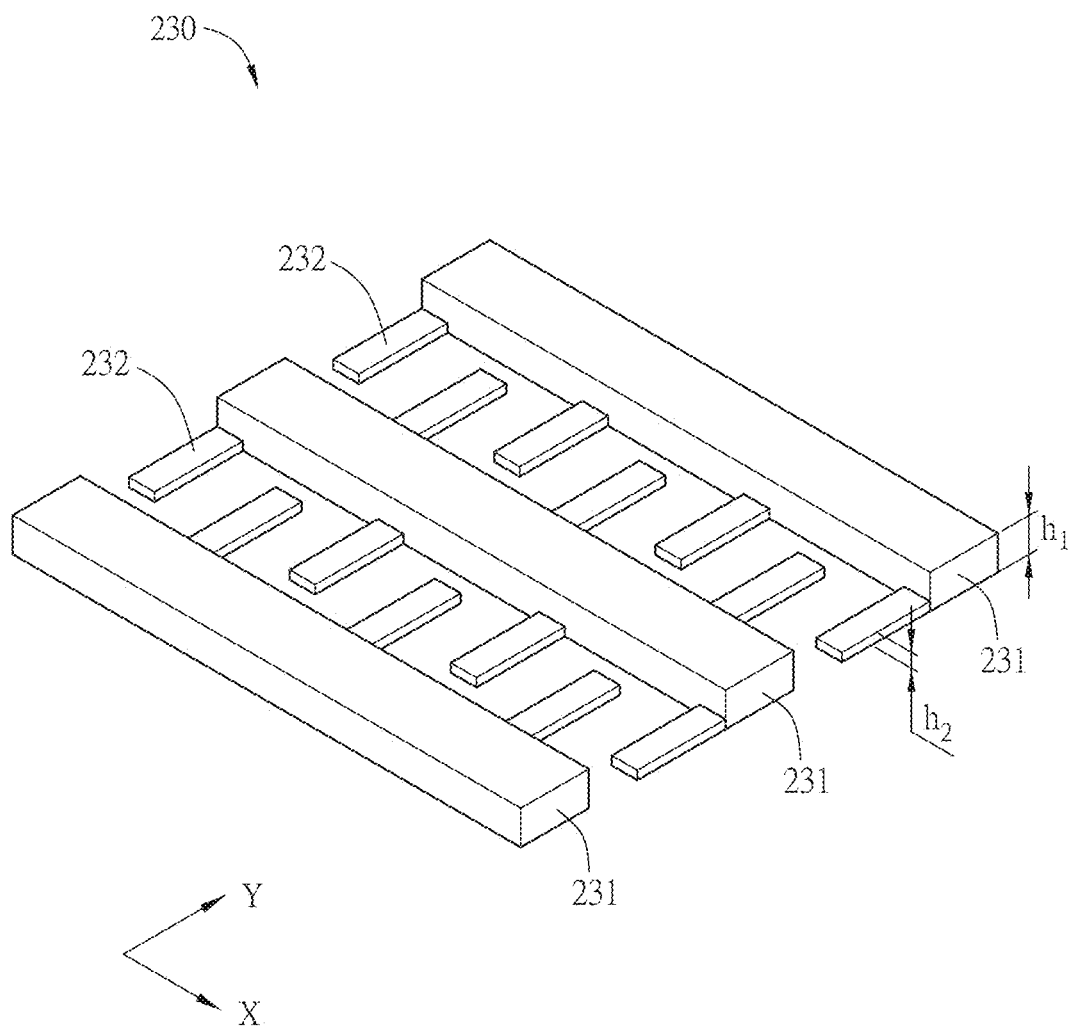
FIG. 5A is a schematic diagram of the black matrix according to the second embodiment of the disclosure.
Figure 5B:
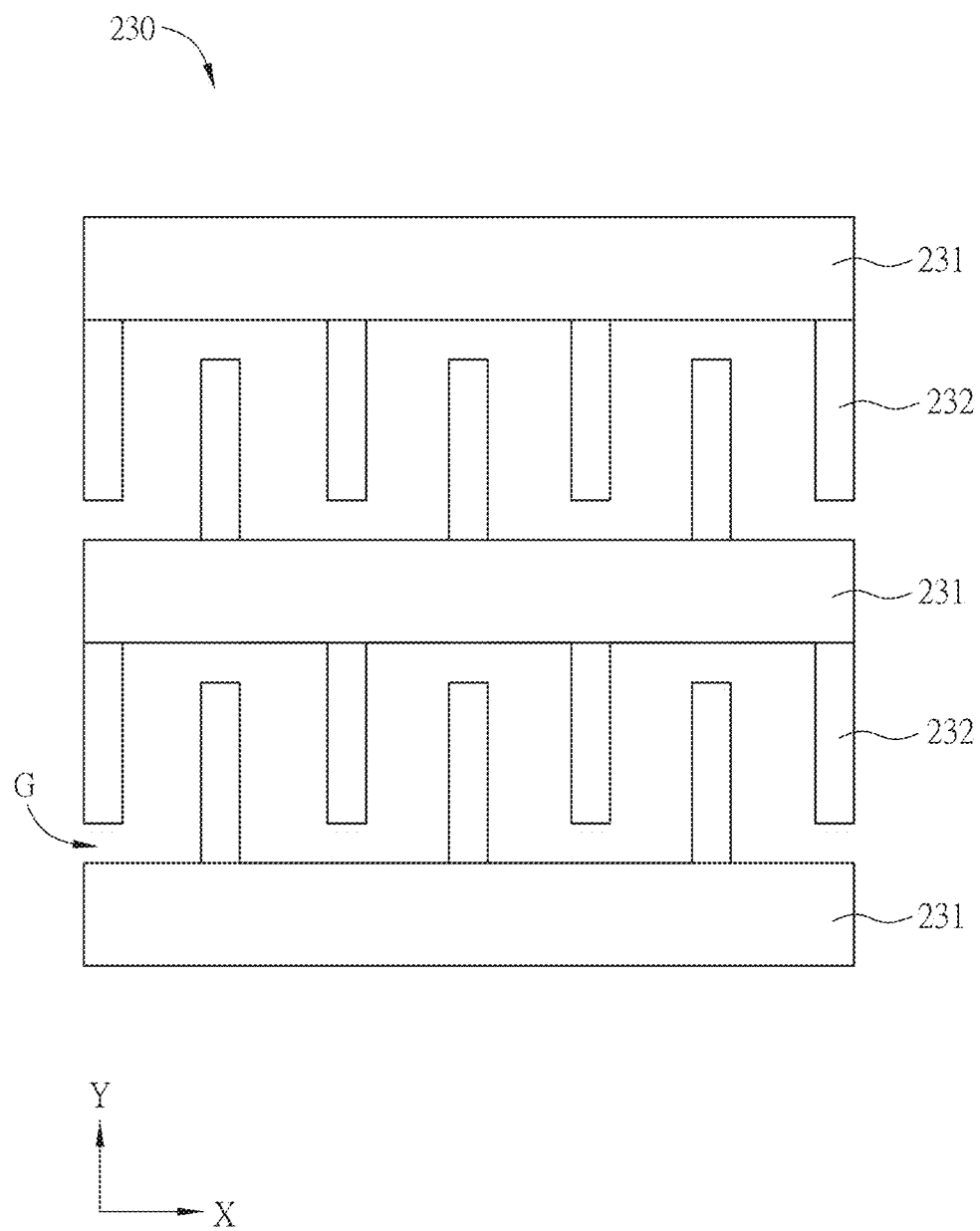
FIG. 5B is a schematic top-view diagram of the black matrix according to the second embodiment of the disclosure.

Then, refer to FIGS. 5A and 5B, which are schematic perspective and top-view diagrams of the black matrix according to the second embodiment of the disclosure.

Like the first embodiment of FIG. 3, the black matrix 230 of this embodiment includes a plurality of row shading bars 231 and a plurality of column shading bars 232. The row shading bars 231 have a first thickness $h_1$. The column shading bars 232 have a second thickness $h_2$. The second thickness $h_2$ is less than the first thickness $h_1$.

The main difference from the above embodiment is that each of the column shading bars 232 disposed between the two adjacent row shading bars 231 is connected to one of the two adjacent row shading bars 231. In other words, one end of the column shading bar 232 is connected to one of the adjacent row shading bars 231, but the other end is separated from the other adjacent row shading bar 231. In this embodiment, the connection of the two adjacent row shading bars 231 and the column shading bars 232 is implemented in an alternate manner. The column shading bars 232 include a third column shading bar and a fourth column shading bar disposed between the two adjacent row shading bars 231, the third column shading bar is adjacent to the fourth shading bar, the third column shading bar is separated from one of the two adjacent row shading bars 231, and the fourth column shading bar is separated from the other one of the two adjacent row shading bars 231. For example, the odd-numbered column shading bars 232 are connected to one of the two adjacent row shading bars 231, and the even-numbered column shading bars 232 are connected to the other one of the two adjacent row shading bars 231.

As shown in FIG. 5B, a gap G is formed between the column shading bar 232 and the row shading bars 231, and can be between 0.5 μm and 5.0 μm according to different requirements. The gap G of this embodiment is 3.0 μm, but this disclosure is not limited thereto.

The advantage of this embodiment is that the flow guiding channels can be formed during the process to allow the developer solution to flow out easily, so that the remaining carbon and photoresist will be avoided and the transmittance of the display panel can be thus enhanced.

The disposition and effect of other elements can be comprehended by referring to the above embodiment and therefore are not described here for conciseness.

Figure 6:
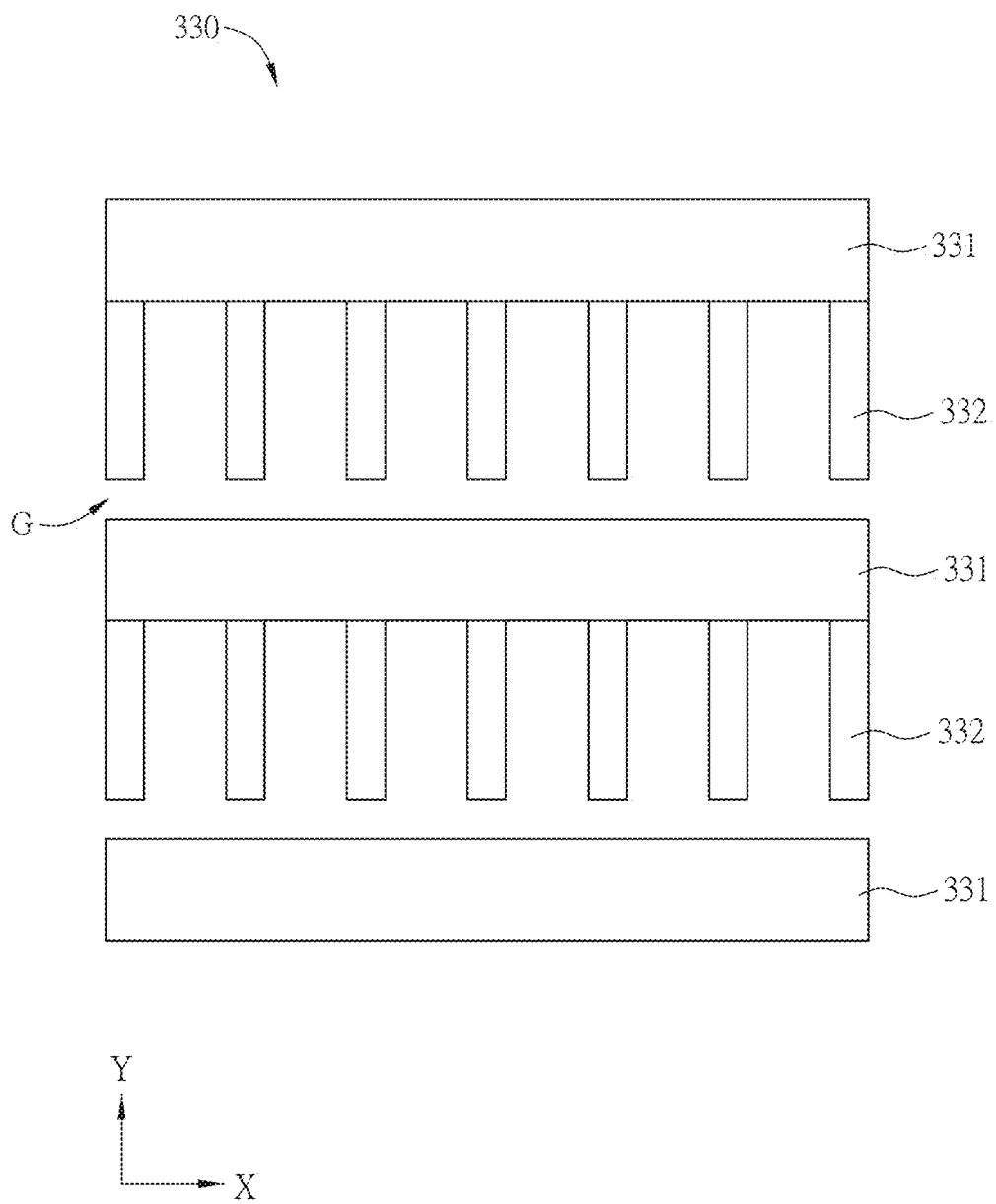
FIG. 6 is a schematic top-view diagram of the black matrix according to the third embodiment of the disclosure.
Figure 7:
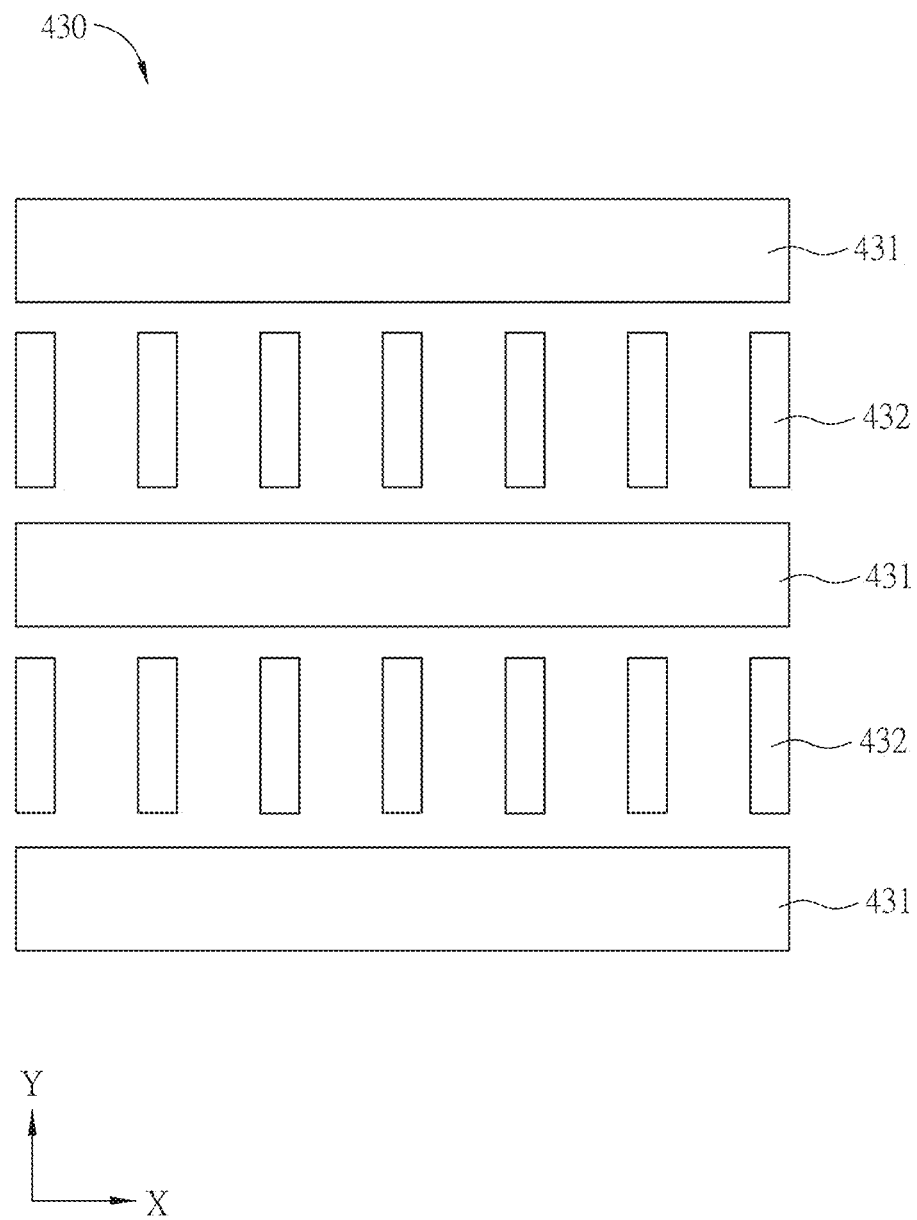
FIG. 7 is a schematic top-view diagram of the black matrix according to the fourth embodiment of the disclosure.

FIGS. 6 and 7 are schematic top-view diagrams of the black matrix according to the third embodiment and fourth embodiment of the disclosure.

Like the second embodiment, the black matrix 330 of the third embodiment includes a plurality of row shading bars 331 and a plurality of column shading bars 332. The row shading bars 331 have a first thickness (not shown). The column shading bars 332 have a second thickness (not shown). The second thickness is less than the first thickness. Moreover, the row shading bars 331 of this embodiment are connected to a part of the column shading bars 332, and that is, one end of the column shading bar 332 is connected to the row shading bar 331 but the other end is separate from the other row shading bars 331.

The main difference from the second embodiment is that the column shading bars 332 disposed between the two adjacent row shading bars 331 are connected to one of the two adjacent row shading bars 331 at the same side and are separated from the other one of the two adjacent row shading bars 331 at the other side, so that the gaps G are formed on the same side.

The black matrix 430 of the fourth embodiment also includes a plurality of row shading bars 431 and a plurality of column shading bars 432. The row shading bars 431 have a first thickness (not shown). The column shading bars 432 have a second thickness (not shown). The second thickness is less than the first thickness.

The main difference from the second and third embodiments is that the column shading bars 432 disposed between the two adjacent row shading bars 431 are separated from the two adjacent row shading bars 431.

The disposition and effect of other elements can be comprehended by referring to the above embodiments and therefore are not described here for conciseness.

Figure 8:
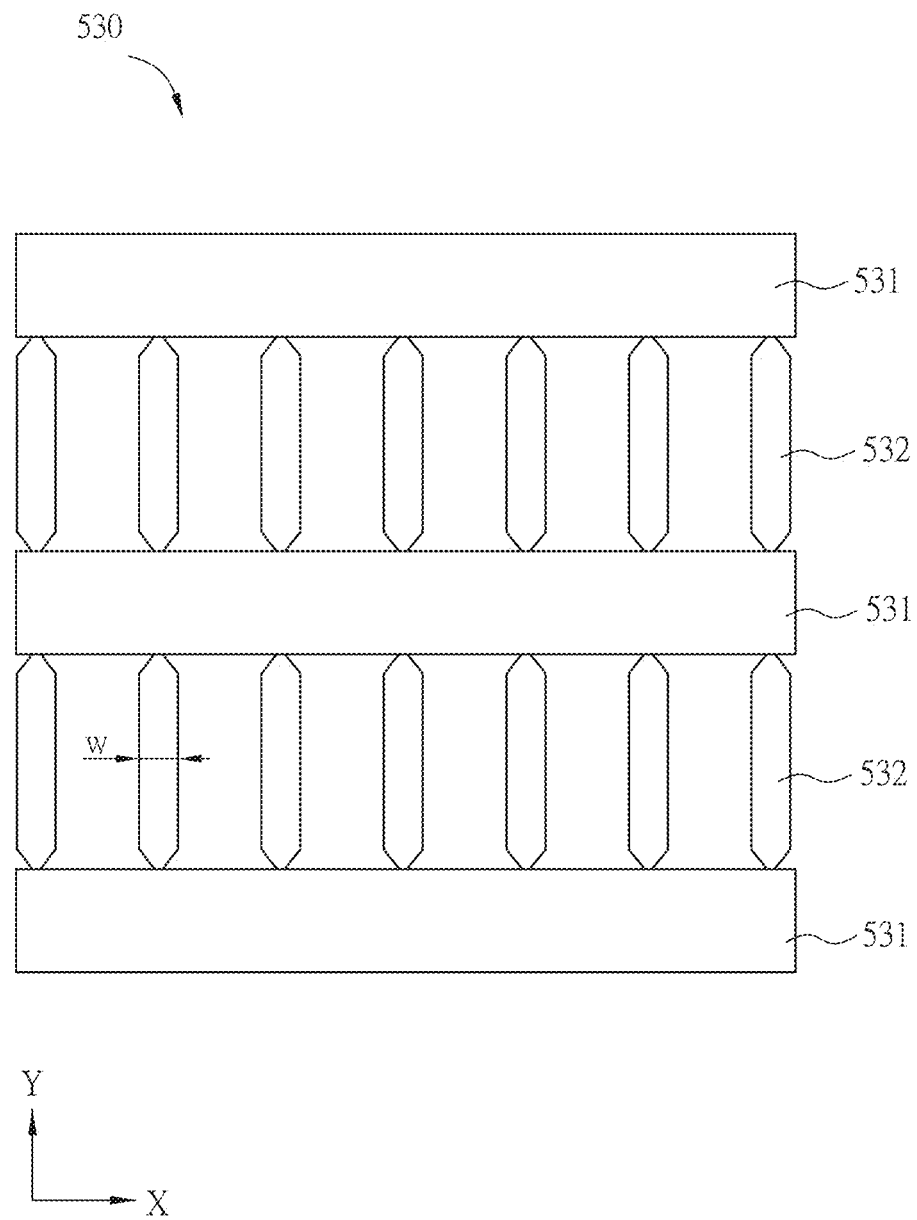
FIG. 8 is a schematic top-view diagram of the black matrix according to the fifth embodiments of the disclosure.
Figure 9:
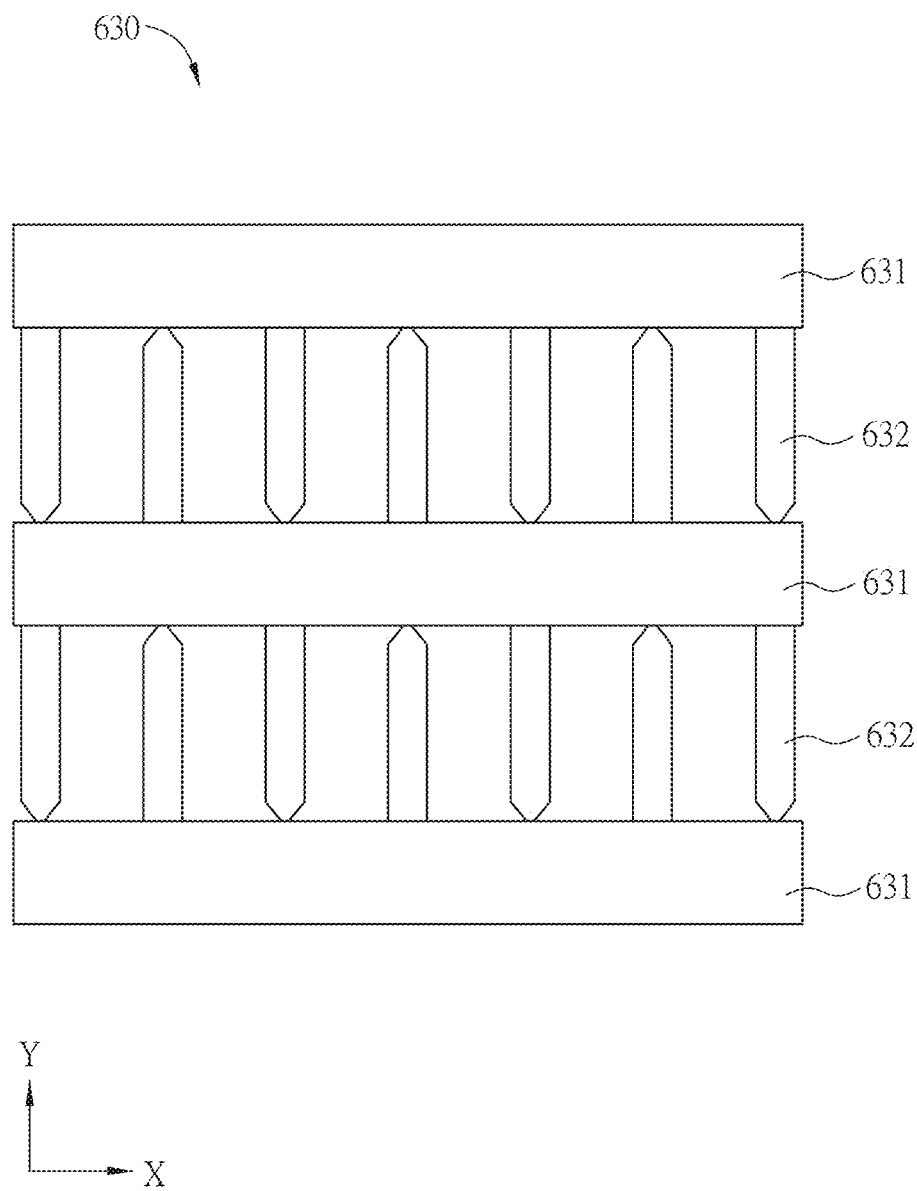
FIG. 9 is a schematic top-view diagram of the black matrix according to the sixth embodiments of the disclosure.
Figure 10:
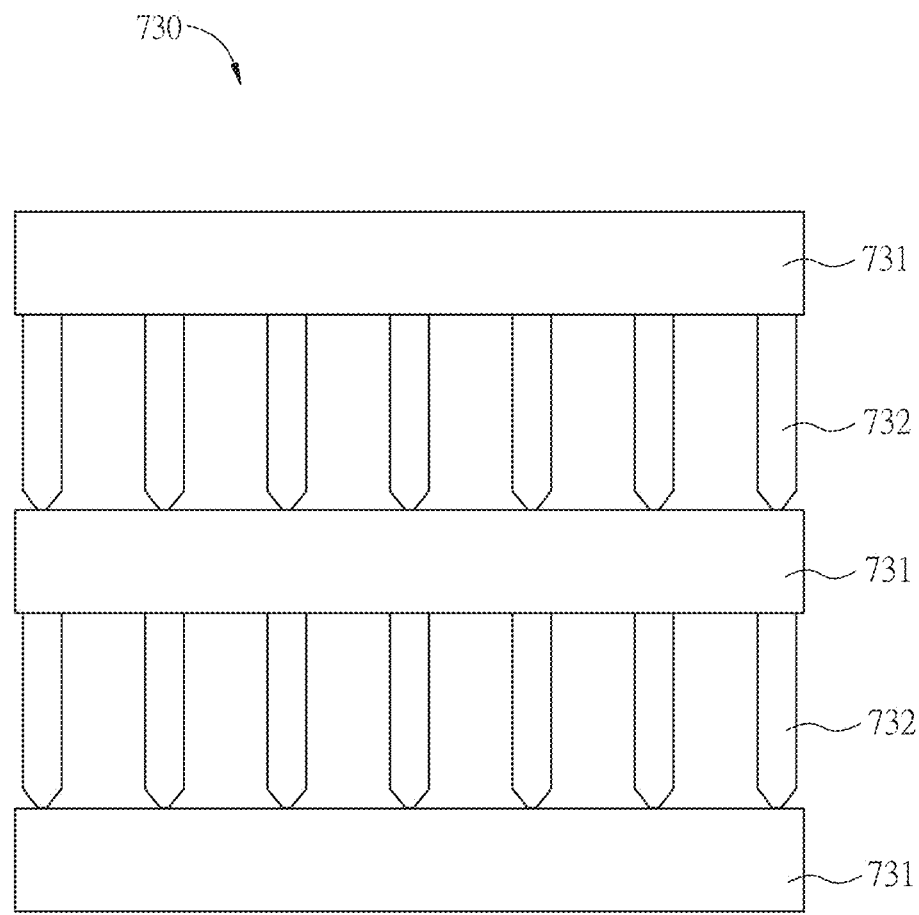
FIG. 10 is a schematic top-view diagram of the black matrix according to the seventh embodiments of the disclosure.

FIGS. 8 to 10 are schematic top-view diagrams of the black matrix according to the fifth, sixth and seventh embodiments of the disclosure.

Refer to the fifth embodiment shown in FIG. 8. Like the first embodiment in FIG. 3, the black matrix 530 of the this embodiment includes a plurality of row shading bars 531 and a plurality of column shading bars 532. The row shading bars 531 have a first thickness (not shown). The column shading bars 532 have a second thickness (not shown). The second thickness is less than the first thickness.

The main difference from the first embodiment is that the two ends of the column shading bars 532 disposed between the two adjacent row shading bars 531 are connected to the two adjacent row shading bars 531, and the width w of the column shading bars 532 varies along the Y direction (the second direction). Herein for example, the width of the two ends of the one of the column shading bars 532 are less than the width of a central part of the one of the column shading bars 532. In detail, the two ends of the column shading bar 532 at the vicinity to the row shading bars 531 have a narrower width, so that the developer solution can flow out more easily. Therefore, the remaining carbon and photoresist will be reduced or avoided and the transmittance of the display panel can be thus enhanced.

Then, refer to the sixth embodiment of FIG. 9. Like the fifth embodiment, the black matrix 630 of the this embodiment includes a plurality of row shading bars 631 and a plurality of column shading bars 632. The row shading bars 631 have a first thickness (not shown). The column shading bars 632 have a second thickness (not shown). The second thickness is less than the first thickness.

The main difference from the fifth embodiment is that only one end of the column shading bar 632 of this embodiment at the vicinity to the row shading bar 631 has a narrower width. Besides, the narrower ends of the column shading bars 632 are disposed in an alternate manner.

Then, refer to the seventh embodiment of FIG. 10. Like the fifth embodiment, the black matrix 730 of the this embodiment includes a plurality of row shading bars 731 and a plurality of column shading bars 732. The row shading bars 731 have a first thickness (not shown). The column shading bars 732 have a second thickness (not shown). The second thickness is less than the first thickness.

The main difference from the fifth embodiment is that only one end of the column shading bar 732 of this embodiment at the vicinity to the row shading bar 731 has a narrower width. Besides, the narrower ends of the column shading bars 732 are disposed at the same side.

The disposition and effect of other elements can be comprehended by referring to the above embodiments and therefore are not described here for conciseness.

Figure 11:
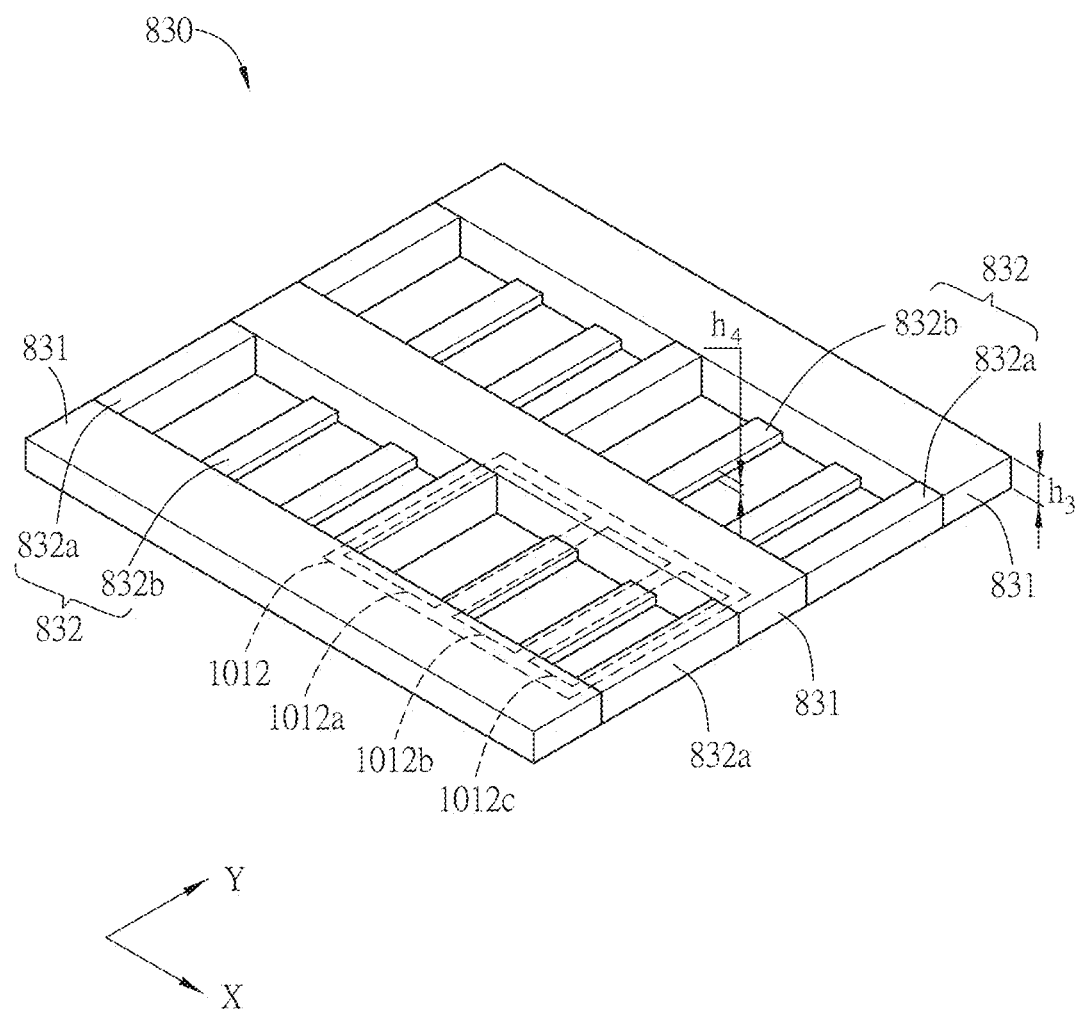
FIG. 11 is a schematic diagram of the black matrix of the eighth embodiment of the disclosure.

FIG. 11 is a schematic diagram of the black matrix of the eighth embodiment of the disclosure.

As shown in FIG. 11, like the first embodiment of FIG. 3, the black matrix 830 of the this embodiment includes a plurality of row shading bars 831 and a plurality of column shading bars 832. The main difference from the first embodiment is that the row shading bars 831 have a first thickness, and the column shading bars 832 have different thicknesses which are less than or equal to the thickness of the row shading bars 831.

In this embodiment, the row shading bars 831 have a first thickness $h_1$. The column shading bars 832 include a first column shading bar 832a and a second column shading bar 832b. The first column shading bar 832a has a third thickness $h_3$, and the second column shading bar 832b has a fourth thickness $h_4$. The third thickness $h_3$ is greater than the fourth thickness $h_4$, and is less than or equal to the first thickness $h_1$.

The first column shading bar 832a and the second column shading bar 832b are disposed corresponding to the positions between the adjacent sub-pixel areas 1012a, 1012b, 1012c. The above disposition has an advantage of reducing the optical interference between the unit pixels 1012.

In order to help understanding the relative positions of the pixel areas 1012, sub-pixel areas 1012a, 1012b, or 1012c, row shading bars 831 and column shading bars 832, the positions of the pixel area 1012 and sub-pixel areas 1012a, 1012b, 1012c are marked by the dotted line.

In this embodiment, the first column shading bar 832a is disposed between the two adjacent row shading bars 831 and between the two adjacent pixel areas 1012. The second column shading bars 832b are disposed between the two first column shading bars 832a and between the two adjacent sub-pixel areas 1012a, 1012b, or 1012c. In this embodiment, the color mix problem between the pixel areas 1012 can be avoided by the disposition of the first column shading bars 832a.

In another embodiment, the first column shading bars 832a can be disposed between the two adjacent row shading bars 831 and on the opposite sides of the single sub-pixel area, for example, the red sub-pixel area 1012a. Since the human eye is more sensitive to the red color mix, such disposition can avoid the color mix of the red color with other colors of the sub-pixel areas.

To be noted, although this embodiment shows the column shading bars of the two thicknesses, another embodiment may show the regular or irregular variation of the second thicknesses of the column shading bars. For example, the adjacent thicknesses are different, or the thickness of the adjacent column shading bars have a periodic variation.

The disposition and effect of other elements can be comprehended by referring to the above embodiments and therefore are not described here for conciseness.

Figure 12:
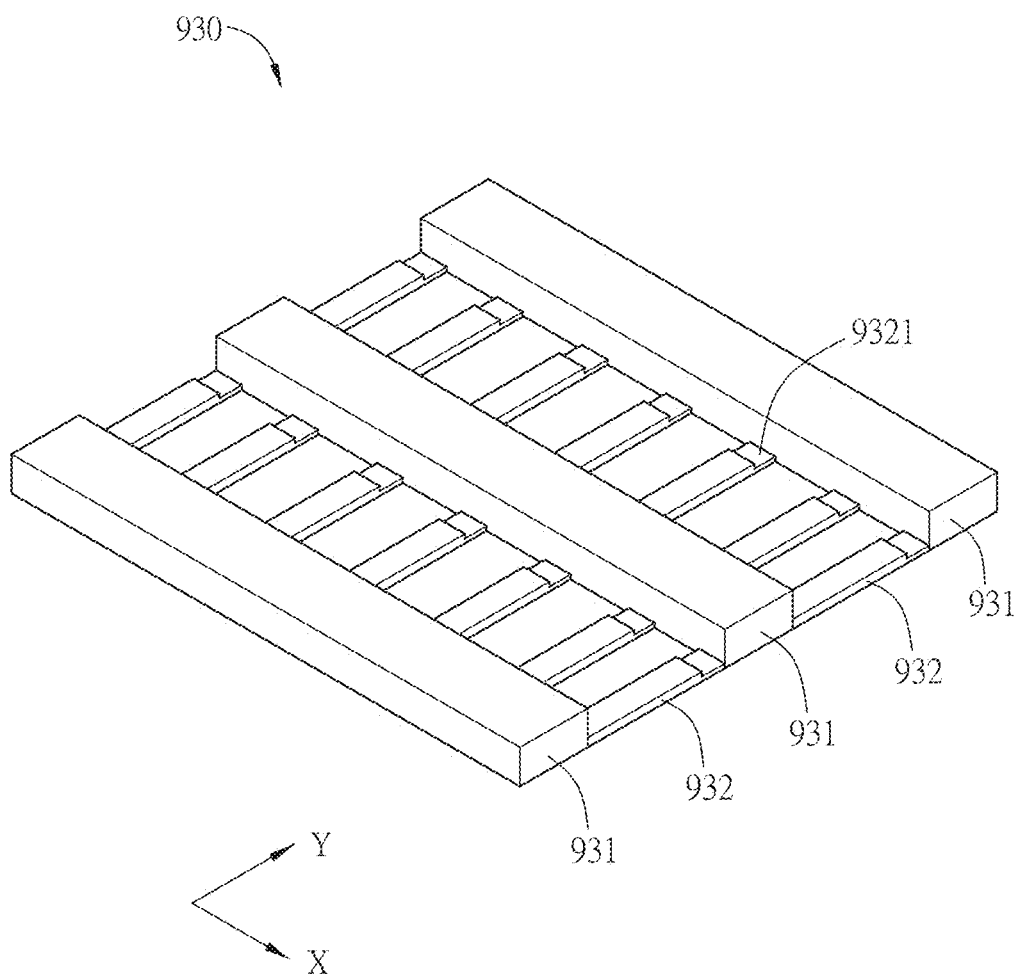
FIG. 12 is a schematic diagram of the black matrix of the ninth embodiment of the disclosure.

FIG. 12 is a schematic diagram of the black matrix of the ninth embodiment of the disclosure.

As shown in FIG. 12, like the first embodiment of FIG. 3, the black matrix 930 of the this embodiment includes a plurality of row shading bars 931 and a plurality of column shading bars 932. The row shading bars 931 have a first thickness. The column shading bars 932 have a second thickness. The second thickness is less than the first thickness.

The main difference from the first embodiment is that the second thicknesses of the column shading bars 932 are varied along the Y direction (the second direction). Herein for example, the thickness of the column shading bar 932 is lessened at the connection with the row shading bar 931 to form a sectional difference 9321. Such design also can achieve the similar effect of the flow guiding channel as the above-mentioned second and third embodiments.

Although this embodiment shows the sectional difference 9321 of the column shading bar 932 is disposed at the connection, the position of the sectional difference is not limited thereto and another embodiment may show the periodic variation of the thickness of the column shading bar to form a wave-like column shading bar.

The disposition and effect of other elements can be comprehended by referring to the above embodiments and therefore are not described here for conciseness.

Summarily, this disclosure adjusts the thickness, shape and layout of the column shading bars of the black matrix to make the pixel areas evener. Thereby, the developer solution or carbon will be not easily left in the pixel areas during the process, and the remaining photoresist problem can be reduced. Therefore, the transmittance of the high-resolution product can be enhanced.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display panel, comprising:
   a first substrate; and
   a shading structure disposed on the first substrate, and comprising:
   a plurality of first parts, wherein one of the plurality of first parts extends along a first direction; and
   a plurality of second parts protruding from the one of the plurality of first parts,
   wherein the plurality of second parts are separated from another one of the plurality of first parts adjacent to the one of the plurality of first parts, and the another one of the plurality of first parts extends along the first direction, a width of each of the plurality of second parts decreases at an end adjacent to the another one of the plurality of first parts.

2. The display panel as recited in claim 1, further comprising:
   a scan line extending along the first direction and corresponding to the one of the plurality of first parts.

3. The display panel as recited in claim 1, wherein a width of at least one of the plurality of second parts is varied along a second direction perpendicular to the first direction.

4. The display panel as recited in claim 1, further comprising:
   a second substrate disposed opposite to the first substrate, and the shading structure is disposed between the first substrate and the second substrate.

5. The display panel as recited in claim 4, further comprising:
   a color filter material disposed between the first substrate and the second substrate.

6. The display panel as recited in claim 1, wherein a thickness of at least one of the plurality of second parts is between 0.5 μm and 1.0 μm.

\* \* \* \* \*